US009628425B2

United States Patent
Kenna et al.

(10) Patent No.: US 9,628,425 B2
(45) Date of Patent: Apr. 18, 2017

(54) REDIRECTING NOTIFICATIONS TO AN ALTERNATIVE COMPUTING DEVICE AND ALLOWING SUBSEQUENT SMS INTERACTIONS TO ADDRESS THE NOTIFICATIONS VIA THAT ALTERNATIVE COMPUTING DEVICE

(71) Applicant: International Business Machines Corporation, Armonk, NY (US)

(72) Inventors: Stephen J. Kenna, Cary, NC (US); Dana L. Price, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 14/454,008

(22) Filed: Aug. 7, 2014

(65) Prior Publication Data

US 2016/0043984 A1   Feb. 11, 2016

(51) Int. Cl.
*G06F 15/16* (2006.01)
*H04L 12/58* (2006.01)
(Continued)

(52) U.S. Cl.
CPC .......... *H04L 51/24* (2013.01); *H04L 12/1895* (2013.01); *H04L 51/18* (2013.01); *H04L 67/2814* (2013.01); *H04L 51/10* (2013.01)

(58) Field of Classification Search
CPC . H04L 51/24; H04L 67/2814; H04L 12/1895; H04L 51/18; H04L 51/10
See application file for complete search history.

(56) References Cited

U.S. PATENT DOCUMENTS 8,816,845 B2 * 8/2014 Hoover ................. B60N 2/002
340/539.11
8,825,836 B1 * 9/2014 Gibson ................. H04L 51/24
709/223
(Continued)

FOREIGN PATENT DOCUMENTS

WO        2004039019 A1      5/2004

OTHER PUBLICATIONS

"How to Set up Email Forwarding," https://www.fastmail.fm/help/receive/forward.html, 2013, one page.
(Continued)

*Primary Examiner* — Brian P Whipple
(74) *Attorney, Agent, or Firm* — Robert A. Voigt, Jr.; Winstead, P.C.

(57) ABSTRACT

A method, system and computer program product for handling notifications. An instruction from the user is received to redirect notifications to alternative computing device(s). After a notification (e.g., operating system update) is received from a computing device (e.g., computing device of the presenter of an electronic presentation), the notification is queued. A graphical representation of the notification is saved as an image and the action buttons within the notification are translated into textual actions. The image of the graphical representation of the notification and the textual actions are sent to the alterative computing device(s), such as via MMS. In this manner, notifications are prevented from being displayed and interrupting the user, such as a presenter of a presentation, by redirecting such notifications to an alternative computing device. Furthermore, in this manner, the user of the alternative device is able to respond to the notification via SMS.

20 Claims, 6 Drawing Sheets

(51) Int. Cl.
*H04L 12/18* (2006.01)
*H04L 29/08* (2006.01)

(56) References Cited

U.S. PATENT DOCUMENTS

| | | | |
|---|---|---|---|
| 2004/0083271 A1* | 4/2004 | Tosey et al. | H04L 12/587 |
| | | | 709/207 |
| 2006/0248122 A1* | 11/2006 | Nikiel | H04L 67/06 |
| 2007/0136301 A1 | 6/2007 | Jardin | |
| 2008/0301175 A1* | 12/2008 | Applebaum | G06F 17/3051 |
| 2009/0113452 A1* | 4/2009 | Grigsby | H04L 51/043 |
| | | | 719/318 |
| 2011/0282836 A1* | 11/2011 | Erickson | G06F 17/30575 |
| | | | 707/622 |
| 2013/0061085 A1 | 3/2013 | Raja Rao | |
| 2014/0067978 A1* | 3/2014 | Tonegawa | G06Q 10/107 |
| | | | 709/206 |
| 2015/0081764 A1* | 3/2015 | Zhao | H04L 67/08 |
| | | | 709/203 |
| 2015/0082239 A1* | 3/2015 | Zhao | H04L 67/2823 |
| | | | 715/788 |
| 2015/0145669 A1* | 5/2015 | Faaborg | H04L 51/22 |
| | | | 340/527 |

OTHER PUBLICATIONS

"Send and Receive Text Messages (SMS)," http://office.microsoft.com/en-us/outlook-help/send-and-receive-text-messages-sms-HA101823438.aspx, 2013, pp. 1-6.

\* cited by examiner

REDIRECTING NOTIFICATIONS TO AN ALTERNATIVE COMPUTING DEVICE AND ALLOWING SUBSEQUENT SMS INTERACTIONS TO ADDRESS THE NOTIFICATIONS VIA THAT ALTERNATIVE COMPUTING DEVICE

TECHNICAL FIELD

The present invention relates generally to notifications, such as those received during electronic presentations, and more particularly to redirecting notifications to an alternative computing device (e.g., smartphone) and allowing subsequent SMS interactions to address the notifications via that alternative computing device.

BACKGROUND

Electronic presentations, particularly electronic slide presentations (hereinafter, "slide presentations"), have become key tools for conveying information to an audience during a speech or other presentation. In a typical slide presentation, a presenter utilizes a presentation program on the presenter's computing device (e.g., laptop computer) to create and arrange multiple slides and then present the slides to an audience beginning with the first slide and ending with the last slide. Typically, the presentation materials that are presented to the audience are also shown on the presenter's computing device.

During the presentation, the presenter may receive some unexpected instant message or mandated system update (e.g., operating system update) that is displayed on the presenter's computing device, and consequently, may be displayed to the audience along with the presentation materials. Such notifications interrupt the presentation and may not be easily turned off.

As a result, presenters attempt to close applications running on the presenter's computing device that are known to have notifications. However, there are notifications that cannot be anticipated (e.g., security scan requirements, operating system updates, etc.). Also, there may be applications that the presenter needs to keep active which may receive/generate notifications. Furthermore, even if the presenter closed all the applications except for the presentation program, the presenter may still receive notifications, such as notifications pertaining to the operating system or to the security of the computing device.

While there have been attempts to address receiving notifications during a presentation, there is not currently a means for preventing such notifications from being displayed while allowing the presenter to continue to use applications during the presentation that may receive/generate such notifications.

BRIEF SUMMARY

In one embodiment of the present invention, a method for handling notifications comprises receiving an instruction to redirect notifications to one or more alternative computing devices. The method further comprises receiving a notification from a computing device. The method additionally comprises queuing the received notification. Furthermore, the method comprises saving a graphical representation of the notification as an image. Additionally, the method comprises translating, by a processor, action buttons within the notification into textual actions. In addition, the method comprises sending the image of the graphical representation of the notification and the textual actions to one of the one or more alternative computing devices.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for handling notifications. In one embodiment of the present invention, an instruction from the user is received to redirect notifications to alternative computing device(s). After a notification (e.g., operating system update) is received from a computing device (e.g., computing device of the presenter of an electronic presentation), the notification is queued. A graphical representation of the notification is saved as an image and the action buttons within the notification are translated into textual actions. The image of the graphical representation of the notification and the textual actions are sent to the alterative computing device(s), such as via MMS. In this manner, notifications are prevented from being displayed on the computing device screen, thus interrupting the user, by redirecting such notifications to an alternative computing device. Furthermore, in this manner, the user of the alternative device is able to respond to the notification via SMS.

While the following discusses the present invention in connection with addressing notifications that appear during an electronic presentation, the principles of the present invention may be applied to any situation involving a computing device receiving/generating interrupting notifications. For example, notifications could be redirected when the user is moving from one location to another location or when a co-worker is backing the user up. A person of ordinary skill in the art would be capable of applying the principles of the present invention to such implementations. Further, embodiments applying the principles of the present invention to such implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
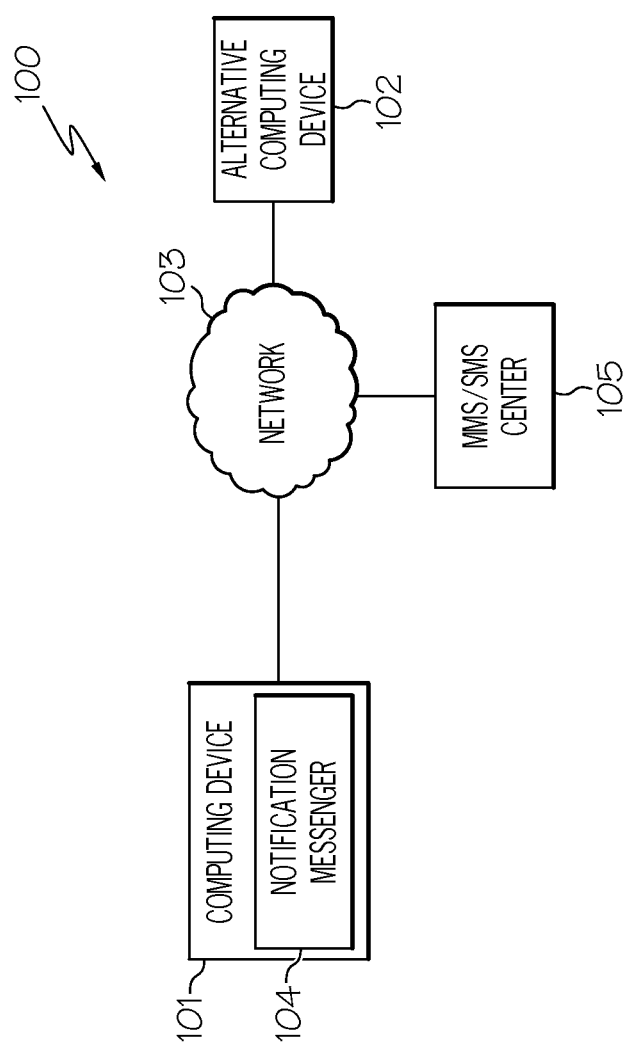
FIG. 1 illustrates a communication system configured in accordance with an embodiment of the present invention.

Referring now to the Figures in detail, FIG. 1 illustrates a communication system 100 for practicing the principles of the present invention in accordance with an embodiment of the present invention. Communication system 100 includes a computing device 101 connected to an alternative computing device 102 via a network 103. "Computing device 101," as used herein, refers to the source computing device that receives/generates notifications, such as during an electronic presentation (e.g., electronic slide presentation). In an embodiment concerning an electronic presentation, computing device 101 may be said to be the presenter computing device (i.e., the computing device of the presenter). "Alternative computing device 102," as used herein refers to the computing device to receive the notifications that are redirected from computing device 101 as discussed further below. In this manner, these notifications will not be displayed to the user of computing device 101 thereby preventing any interruptions to the user of computing device 101.

Computing device 101, alternative computing device 102 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with one another. A description of the hardware configuration of computing device 101 is provided below in connection with FIG. 2.

In one embodiment, any user of computing device 101, alternative computing device 102 may be able to send and receive text messages, such as Short Message Services (SMS) messages or Multimedia Messaging Services (MMS) messages, as well as instant messages, such as using Sametime®, Hangouts™, AOL Instant Messenger®, Facebook® Messenger, etc. While the following discusses the present invention in connection with using text messages, the principles of the present invention may be applied to using instant messages. A person of ordinary skill in the art would be capable of applying the principles of the present invention to such implementations. Further, embodiments applying the principles of the present invention to such implementations would fall within the scope of the present invention.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In communication system 100, computing device 101 includes a software agent, referred to herein as the "notification messenger" 104, configured to redirect notifications to alternative computing device 102 as discussed further below.

System 100 further includes a Multimedia Messaging Service (MMS)/Short Message Service (SMS) center 105 configured to relay, store and forward messages with multimedia content, such as MMS messages, and/or text messages, such as SMS messages, among computing device 101, alternative computing device 102 through network 103.

System 100 is not to be limited in scope to any one particular network architecture. System 100 may include any number of computing devices 101, alternative computing devices 102, networks 103 and MMS/SMS centers 105.

Figure 2:
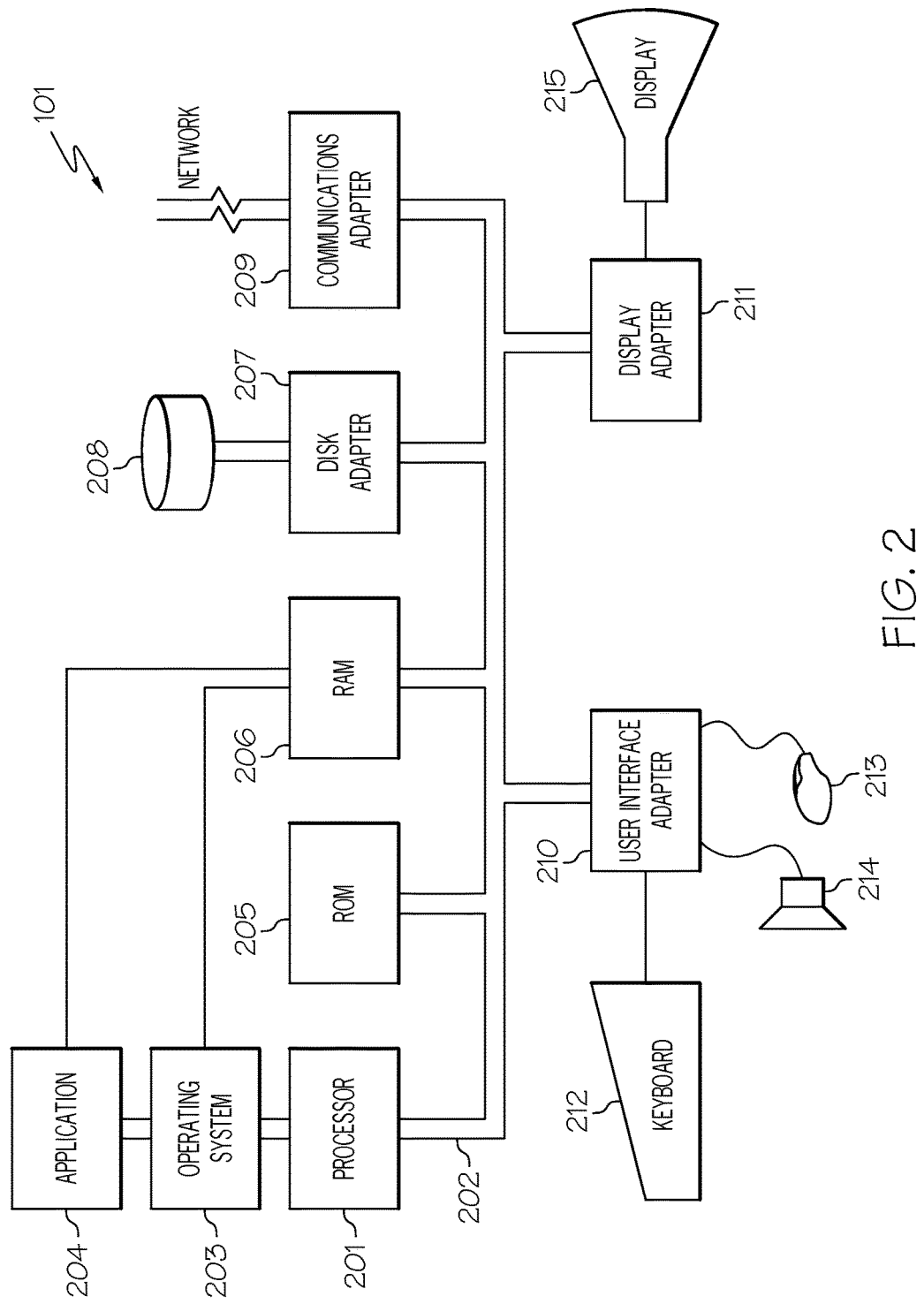
FIG. 2 illustrates a hardware configuration of a computing device for practicing the principles of the present invention in accordance with an embodiment of the present invention.

Referring now to FIG. 2, FIG. 2 illustrates a hardware configuration of computing device 101 (FIG. 1) which is representative of a hardware environment for practicing the present invention. Referring to FIG. 2, computing device 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, notification messenger 104 (FIG. 1) configured to redirect notifications to alternative computing device 102 (FIG. 1) as discussed further below in association with FIGS. 3-7. In one embodiment, notification messenger 104 may be part of operating system 203 or combined with another application (e.g., enterprise application) as opposed to residing as a single application.

Referring again to FIG. 2, read-only memory ("ROM") 205 is coupled to system bus 202 and includes a basic input/output system ("BIOS") that controls certain basic functions of computing device 101. Random access memory ("RAM") 206 and disk adapter 207 are also coupled to system bus 202. It should be noted that software components including operating system 203 and application 204 may be loaded into RAM 206, which may be client device's 101 main memory for execution. Disk adapter 207 may be an integrated drive electronics ("IDE") adapter that communicates with a disk unit 208, e.g., disk drive. It is noted that the program (notification messenger 104) for redirecting notifications to alternative computing device 102, as discussed further below in association with FIGS. 3-7, may reside in disk unit 208 or in application 204.

Computing device 101 may further include a communications adapter 209 coupled to bus 202. Communications adapter 209 interconnects bus 202 with an outside network (e.g., network 103 of FIG. 1) thereby enabling consolidated computing device 101 to communicate with alternative computing device 102 and MMS/SMS center 105.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, electronic presentations, particularly electronic slide presentations (hereinafter, "slide presentations"), have become key tools for conveying information to an audience during a speech or other presentation. In a typical slide presentation, a presenter utilizes a presentation program on the presenter's computing device (e.g., laptop computer) to create and arrange multiple slides and then present the slides to an audience beginning with the first slide and ending with the last slide. Typically, the presentation materials that are presented to the audience are also shown on the presenter's computing device. During the presentation, the presenter may receive some unexpected instant message or mandated system update (e.g., operating system update) that is displayed on the presenter's computing device, and consequently, may be displayed to the audience along with the presentation materials. Such notifications interrupt the presentation and may not be easily turned off. As a result, presenters attempt to close applications running on the presenter's computing device that are known to have notifications. However, there are notifications that cannot be anticipated (e.g., security scan requirements, operating system updates, etc.). Also, there may be applications that the presenter needs to keep active which may receive/generate notifications. Furthermore, even if the presenter closed all the applications except for the presentation program, the presenter may still receive notifications, such as notifications pertaining to the operating system or to the security of the computing device. While there have been attempts to address receiving notifications during a presentation, there is not currently a means for preventing such notifications from being displayed while allowing the presenter to continue to use applications during the presentation that may receive/generate such notifications.

Figure 3:
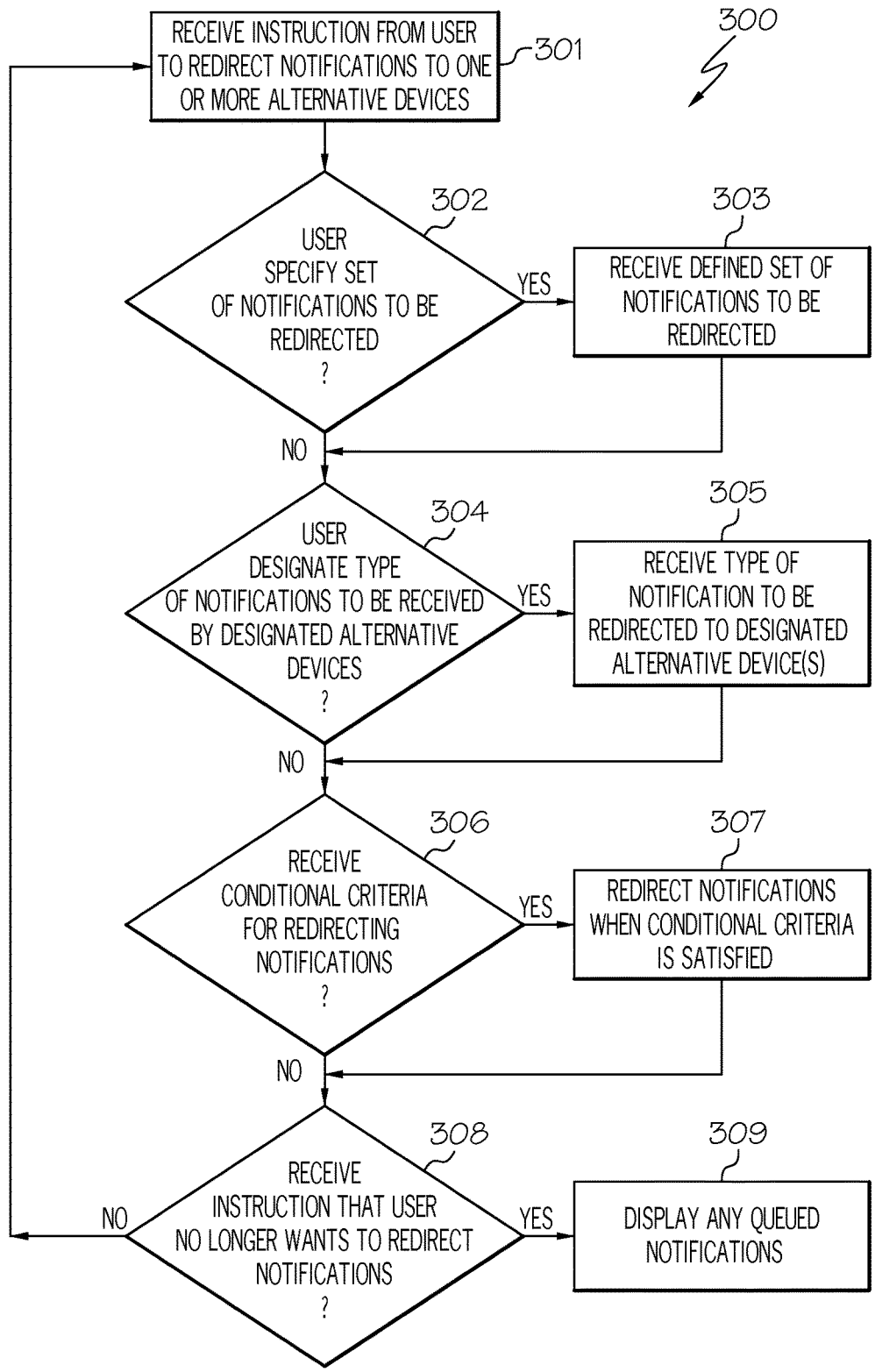
FIG. 3 is a flowchart of a method for establishing notifications to be redirected to alternative computing device(s) in accordance with an embodiment of the present invention.
Figure 4:
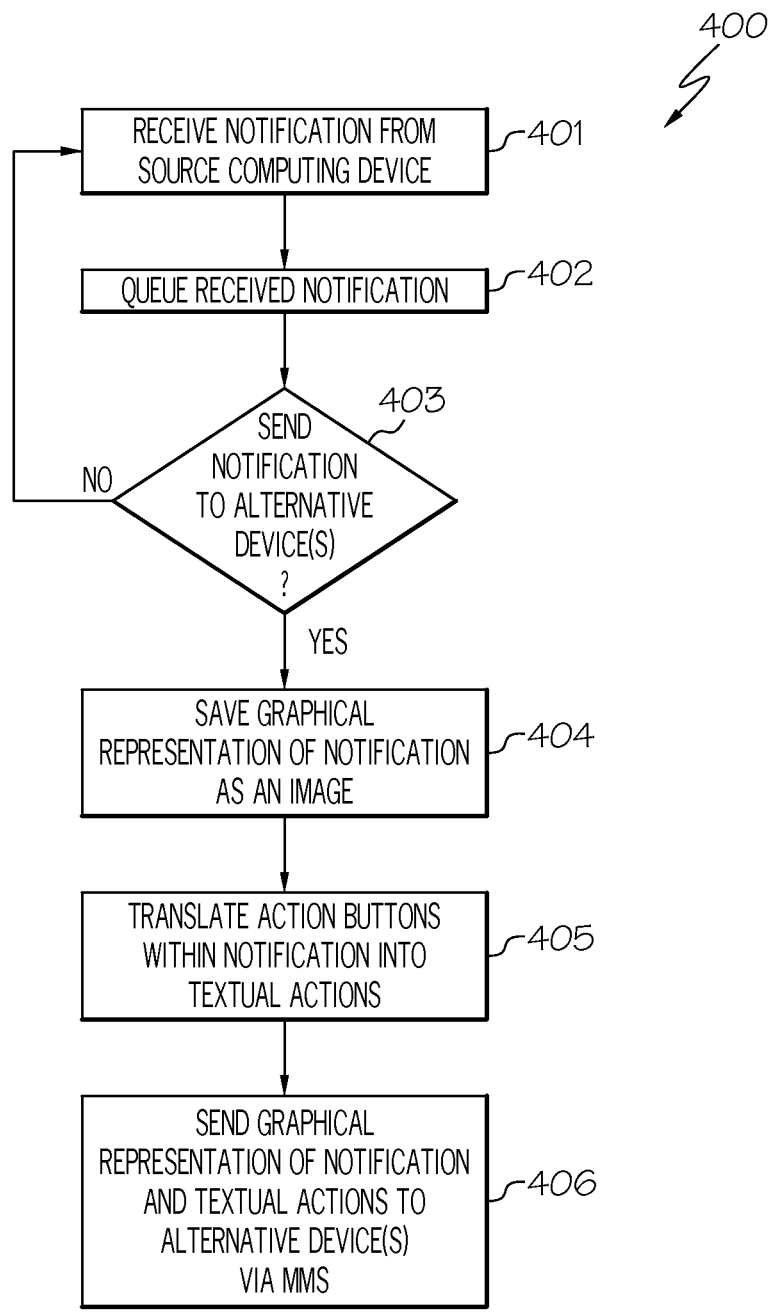
FIG. 4 is a flowchart of a method for redirecting the notifications to alternative computing device(s) in accordance with an embodiment of the present invention.
Figure 5:
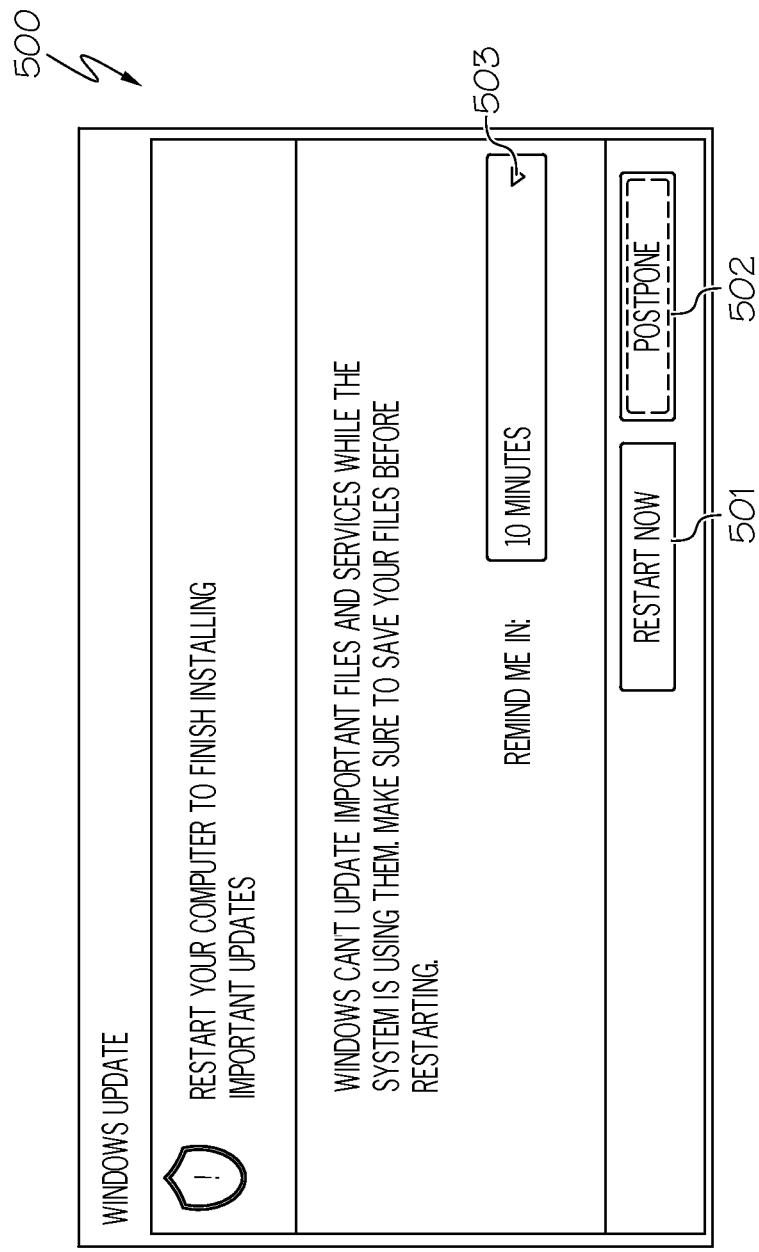
FIG. 5 is an exemplary notification that is prevented from being displayed on the computing device in accordance with an embodiment of the present invention.
Figure 6:
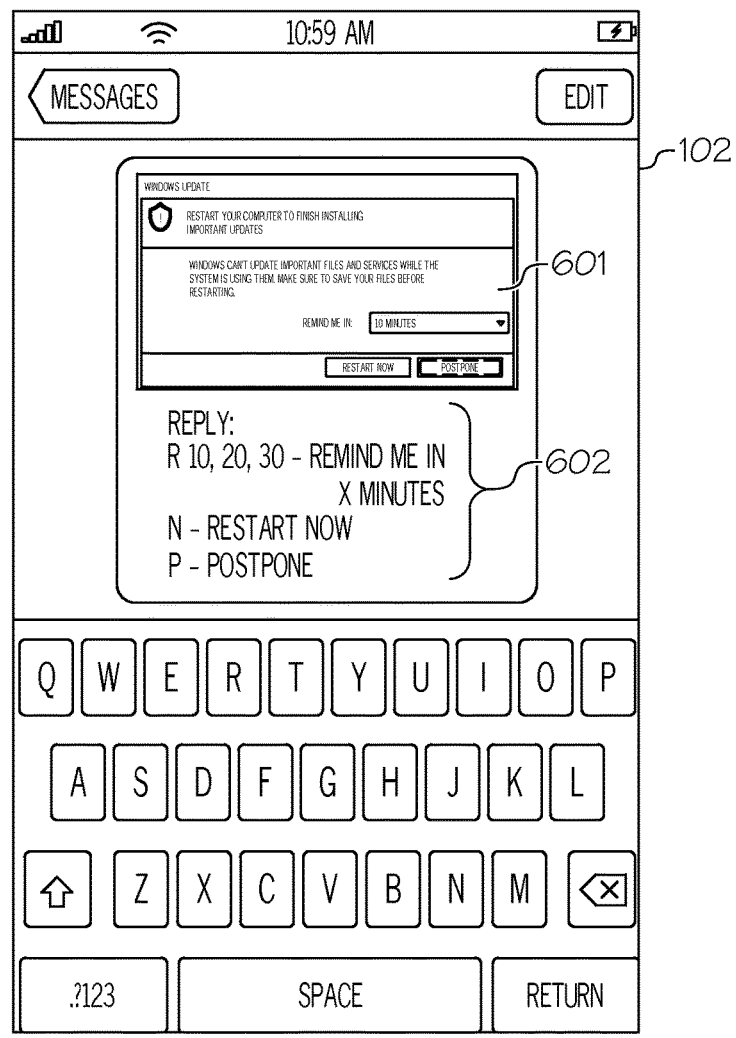
FIG. 6 illustrates the exemplary notification of FIG. 5 that is sent to the user of the alternative computing device which includes an image of the graphical representation of the notification along with its action buttons being translated into textual actions in accordance with an embodiment of the present invention.
Figure 7:
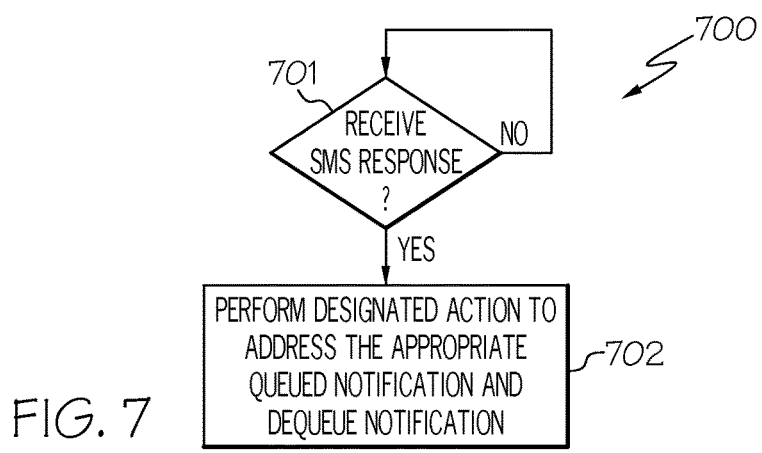
FIG. 7 is a flowchart of a method for addressing a notification by the alternative computing device via SMS responses in accordance with an embodiment of the present invention.

The principles of the present invention provide a means for preventing notifications from being displayed and interrupting the user, such as a presenter of a presentation, by redirecting such notifications to an alternative computing device as discussed below in connection with FIGS. 3-7. FIG. 3 is a flowchart of a method for establishing notifications to be redirected to alternative computing device(s) 102 (FIG. 1). FIG. 4 is a flowchart of a method for redirecting the notifications to alternative computing device(s) 102. FIG. 5 is an exemplary notification that is prevented from being displayed on computing device 101 (FIG. 1). FIG. 6 illustrates the exemplary notification of FIG. 5 that is sent to the user of alternative computing device 102 which includes an image of the graphical representation of the notification along with its action buttons being translated into textual actions. FIG. 7 is a flowchart of a method for addressing a notification by alternative computing device 102 via SMS responses.

As stated above, FIG. 3 is a flowchart of a method 300 for establishing notifications to be redirected to alternative computing device(s) 102 (FIG. 1) in accordance with an embodiment of the present invention.

Referring to FIG. 3, in conjunction with FIGS. 1-2, in step 301, notification messenger 104 receives an instruction from the user of computing device 101 (e.g., presenter of presentation) to redirect notifications to one or more alternative devices 102. In one embodiment, the instruction includes the identification(s) of alternative device(s) 102 to receive the redirected notification.

In step 302, a determination is made by notification messenger 104 as to whether the user specified a set of notifications to be redirected. For example, the user may specify notifications that are received/generated by particular applications to be redirected. In another example, the user may specify notifications of a particular type (e.g., system notifications) to be redirected.

If user specified a set of notifications to be redirected, then, in step 303, notification messenger 104 receives the defined set of notifications, as discussed above, from the user to be redirected.

If, however, the user did not specify a set of notifications to be redirected, or upon receiving the defined set of notifications in step 303, in step 304, a determination is made by notification messenger 104 as to whether the user designated the type of notifications to be received by designated alternative devices 102.

If the user designated the type of notifications to be received by designated alternative computing devices 102, then, in step 305, notification messenger 104 receives a type of notification to be redirected to designated alternative device(s) 102. For example, the user may specify that one particular alternative device 102 is to receive system updates, whereas, another alternative device 102 is to receive mail notifications.

If, however, the user did not designate the type of notifications to be received by designated alternative devices 102, or upon receiving a type of notification to be redirected to designated alternative device(s) 102 in step 305, then, in step 306, a determination is made by notification messenger 104 as to whether any conditional criteria was received for redirecting notifications from the user. For example, the user may specify that notifications are not be redirected until the redirection state has changed.

If notification messenger 104 received conditional criteria for redirecting notifications, then, in step 307, notification messenger 104 redirects the notifications when the conditional criteria is satisfied.

If, however, notification messenger 104 did not receive any conditional criteria for redirecting notifications, or upon receiving the conditional criteria for redirecting notifications in step 307, then, in step 308, a determination is made by notification messenger 104 as to whether an instruction to no longer redirect notifications to alternative computing device(s) 102 was received from the user.

If the user provided an instruction to no longer redirect notifications to alternative computing device(s) 102, then, in step 309, notification messenger 104 displays any queued notifications (a discussion regarding queuing notifications is discussed below in connection with FIG. 4).

If, however, the user did not provide an instruction to no longer redirect notifications to alternative computing device(s) 102, then notification messenger 104 waits to receive a further instruction from the user of computing device 101 (e.g., presenter of presentation) to redirect notifications to one or more alternative devices 102 in step 301.

Upon establishing the notifications that are to be redirected to alternative computing device(s) 102, notification messenger 104 redirects such notifications to alternative computing device(s) 102 as discussed below in connection with FIG. 4.

FIG. 4 is a flowchart of a method 400 for redirecting the notifications to alternative computing device(s) 102 in accordance with an embodiment of the present invention.

Referring to FIG. 4, in conjunction with FIGS. 1-3, in step 401, notification messenger 104 receives a notification from computing device 101. For example, suppose that the user of computing device 101 is currently presenting an electronic slide presentation and does not want any notifications to be displayed. Instead, such notifications (e.g., operating system update) may be directed to notification messenger 104 to be handled.

In step 402, notification messenger 104 queues the received notification. In one embodiment, the queue is a data structure that resides in memory or storage of computing device 101, such as memory 205, 206 or disk unit 208.

In step 403, a determination is made by notification messenger 104 as to whether to send the notification to alternative computing device(s) 102. As discussed above, the determination may be determined, at least in part, based on conditional criteria received in step 306 of FIG. 3. Furthermore, as discussed above, the particular alternative computing device(s) 102 to receive the notification may be determined, at least in part, based on the type of notification as discussed above in connection with step 305 of FIG. 3.

If alternative computing device(s) 102 are not yet to receive the notification, then notification messenger 104 waits to receive another notification from computing device 101 in step 401.

If, however, notification messenger 104 is to send the notification to alternative computing device(s) 102, then, in step 404, notification messenger 104 saves the graphical representation of the notification as an image, where the image may be saved in memory or storage of computing device 101, such as memory 205, 206 or disk unit 208.

In step 405, notification messenger 104 translates the action buttons within the notification into textual actions.

In step 406, notification messenger 104 sends the graphical representation of the notification and textual actions to alternative computing device(s) 102 via MMS as illustrated in FIGS. 5 and 6. In one embodiment, notification messenger 104 only sends the textual actions to alternative computing device(s). In such an embodiment, SMS could be used as opposed to MMS.

In this manner, notifications are prevented from being displayed and interrupting the user, such as a presenter of a presentation, by redirecting such notifications to an alternative computing device. Furthermore, in this manner, the user of the alternative device is able to respond to the notification via SMS as discussed further below.

FIG. 5 is an exemplary notification that is prevented from being displayed on computing device 101 (FIG. 1) in accordance with an embodiment of the present invention. Referring to FIG. 5, operating system notification 500 is received and queued by notification messenger 104. As illustrated in FIG. 5, operating system notification 500 is a notification to restart the computer to finish installing important updates. Operating system notification 500 includes the action buttons of restarting now (identified by "Restart Now" button 501), postponing (identified by "Postpone" button 502) and reminding the user later (identified by "Remind me in: 10 minutes" button 503). The graphical representation of operating system notification 500 is saved as an image with its action buttons 501-503 translated into textual actions as illustrated in FIG. 6.

FIG. 6 illustrates the exemplary notification of FIG. 5 that is sent to the user of alternative computing device 102 which includes an image 601 of the graphical representation of the notification along with its action buttons being translated into textual actions 602 in accordance with an embodiment of the present invention.

Referring to FIG. 6, the graphical representation of operating system notification 500 is saved as an image 601 and sent to alternative computing device 102. Furthermore, as illustrated in FIG. 6, action buttons 501-503 of FIG. 5 are translated into the textual actions of "R 10, 20, 30—remind me in x minutes; N—restart now; P—postpone" 602. In this manner, the user of alternative computing device 102 may respond to the notification, such as via one of the SMS response options.

The SMS response may later be received by notification messenger 104 which will perform the designated action to address the notification as discussed below in connection with FIG. 7.

FIG. 7 is a flowchart of a method 700 for addressing a notification by alternative computing device 102 via SMS responses in accordance with an embodiment of the present invention.

Referring to FIG. 7, in conjunction with FIGS. 1-6, in step 701, a determination is made by notification messenger 104 as to whether it received an SMS response from the user of alternative computing device 102 concerning the notification that was sent to the user of alternative computing device in step 406 of FIG. 4.

If an SMS response has not yet been received, then notification messenger 104 continues to determine whether it received an SMS response from the user of alternative computing device 102 in step 701.

If, however, an SMS response was received by notification messenger 104, then, in step 702, notification messenger 104 performs the designated action to address the appropriate queued notification and then dequeues the notification. For example, referring to FIG. 6, if the user of alternative computing device 102 selected the textual action of "P" for postponing the update, then notification messenger 104 postpones finishing the installation of the updates and dequeues notification 500 from the queue.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for handling notifications, the method comprising:
   receiving an instruction to redirect notifications to one or more alternative computing devices;
   receiving a notification from a computing device;
   queuing said received notification;
   saving a graphical representation of said notification as an image;
   translating, by a processor, action buttons within said notification into textual actions; and
   sending said image of said graphical representation of said notification and said textual actions to one of said one or more alternative computing devices.

2. The method as recited in claim 1, wherein said image of said graphical representation of said notification and said textual actions are sent to said one of said one or more alternative computing devices via multimedia messaging service.

3. The method as recited in claim 1 further comprising:
   receiving a short message service message from said one of said one or more alternative computing devices, wherein said short message service message comprises an action to be performed to address said notification;
   performing said action to address said notification; and
   dequeuing said notification.

4. The method as recited in claim 1 further comprising:
   receiving a defined set of notifications to be redirected.

5. The method as recited in claim 1 further comprising:
   receiving a type of notification to be redirected to one or more of said one or more alternative computing devices.

6. The method as recited in claim 1 further comprising:
receiving conditional criteria for redirecting notifications; and
redirecting said received notification to said one of said one or more alternative computing devices in response to satisfying said conditional criteria.

7. The method as recited in claim 1 further comprising:
displaying any queued notifications in response to receiving an instruction to no longer redirect notifications to said one or more alternative computing devices.

8. A computer program product for handling notifications, the computer program product comprising a computer readable storage medium having program code embodied therewith, the program code comprising the programming instructions for:
receiving an instruction to redirect notifications to one or more alternative computing devices;
receiving a notification from a computing device;
queuing said received notification;
saving a graphical representation of said notification as an image;
translating action buttons within said notification into textual actions; and
sending said image of said graphical representation of said notification and said textual actions to one of said one or more alternative computing devices.

9. The computer program product as recited in claim 8, wherein said image of said graphical representation of said notification and said textual actions are sent to said one of said one or more alternative computing devices via multimedia messaging service.

10. The computer program product as recited in claim 8, wherein the program code further comprises the programming instructions for:
receiving a short message service message from said one of said one or more alternative computing devices, wherein said short message service message comprises an action to be performed to address said notification;
performing said action to address said notification; and
dequeuing said notification.

11. The computer program product as recited in claim 8, wherein the program code further comprises the programming instructions for:
receiving a defined set of notifications to be redirected.

12. The computer program product as recited in claim 8, wherein the program code further comprises the programming instructions for:
receiving a type of notification to be redirected to one or more of said one or more alternative computing devices.

13. The computer program product as recited in claim 8, wherein the program code further comprises the programming instructions for:
receiving conditional criteria for redirecting notifications; and
redirecting said received notification to said one of said one or more alternative computing devices in response to satisfying said conditional criteria.

14. The computer program product as recited in claim 8, wherein the program code further comprises the programming instructions for:
displaying any queued notifications in response to receiving an instruction to no longer redirect notifications to said one or more alternative computing devices.

15. A system, comprising:
a memory unit for storing a computer program for handling notifications; and
a processor coupled to the memory unit, wherein the processor is configured to execute the program instructions of the computer program comprising:
receiving an instruction to redirect notifications to one or more alternative computing devices;
receiving a notification from a computing device;
queuing said received notification;
saving a graphical representation of said notification as an image;
translating action buttons within said notification into textual actions; and
sending said image of said graphical representation of said notification and said textual actions to one of said one or more alternative computing devices.

16. The system as recited in claim 15, wherein said image of said graphical representation of said notification and said textual actions are sent to said one of said one or more alternative computing devices via multimedia messaging service.

17. The system as recited in claim 15, wherein the program instructions of the computer program further comprises:
receiving a short message service message from said one of said one or more alternative computing devices, wherein said short message service message comprises an action to be performed to address said notification;
performing said action to address said notification; and
dequeuing said notification.

18. The system as recited in claim 15, wherein the program instructions of the computer program further comprises:
receiving a defined set of notifications to be redirected.

19. The system as recited in claim 15, wherein the program instructions of the computer program further comprises:
receiving conditional criteria for redirecting notifications; and
redirecting said received notification to said one of said one or more alternative computing devices in response to satisfying said conditional criteria.

20. The system as recited in claim 15, wherein the program instructions of the computer program further comprises:
displaying any queued notifications in response to receiving an instruction to no longer redirect notifications to said one or more alternative computing devices.

* * * * *